United States Patent [19]
Michelet et al.

[11] 3,927,045
[45] Dec. 16, 1975

[54] PROCESS FOR THE PREPARATION OF TRIMETHYL-PARA-BENZAQUINONE

[75] Inventors: Daniel Michelet, Tassin-La-Demi-Lume; Michel Razoutz, Ouillon, both of France

[73] Assignee: Rhone-Poulenc, Paris, France

[22] Filed: Jan. 14, 1974

[21] Appl. No.: 432,984

[30] Foreign Application Priority Data
Jan. 15, 1973  France ............................. 73.01302

[52] U.S. Cl. ......................... 260/396 R; 260/621 H
[51] Int. Cl.² .................... C07C 45/16; C07C 37/00
[58] Field of Search ......... 260/621 R, 622 H, 396 R

[56] References Cited
UNITED STATES PATENTS

| | | | |
|---|---|---|---|
| 2,259,936 | 10/1941 | Jung | 260/621 H |
| 3,499,011 | 3/1970 | Idyll | 260/396 R |
| 3,700,701 | 10/1972 | Dietl et al. | 260/396 R |
| 3,723,541 | 3/1973 | Schuster et al. | 260/621 H |
| 3,795,708 | 3/1974 | Rappen et al. | 260/621 H |
| 3,839,468 | 10/1974 | Tamai et al. | 260/621 H |
| 3,842,130 | 10/1974 | Kawaguchi | 260/621 H |

*Primary Examiner*—Norman P. Morgenstern
*Attorney, Agent, or Firm*—Cushman, Darby & Cushman

[57] ABSTRACT

2,3,6-Trimethyl-phenol is converted to trimethyl hydroquinone by oxidising the phenol with hydrated manganese dioxide in the presence of an aliphatic carboxylic acid containing 1–3 carbon atoms and then reducing the resulting benzoquinone.

9 Claims, No Drawings

PROCESS FOR THE PREPARATION OF TRIMETHYL-PARA-BENZAQUINONE

The present invention relates to a process for the preparation of trimethylhydroquinone from 2,3,6-trimethylphenol or 3-pseudocumenol.

Trimethylhydroquinone is the precursor of vitamin E, and various methods of preparation have been proposed to obtain it in the pure state at the most advantageous cost price. One of these methods consists of oxidising 3-pseudocumenol to pseudocumoquinone which is then reduced to trimethylhydroquinone.

In this two-stage process, since it is known how to reduce quinone to hydroquinone quantitatively, the attempt to improve the yield is consequently based on the step of oxidising 3-pseudocumenol to pseudocumoquinone. Various methods have been proposed to carry out this oxidation. It is known that the oxidation of phenolic compounds by means of air does not take place satisfactorily, since phenolic compounds are themselves inhibitors of oxidation by means of air. However, it is possible to oxidise 3-pseudocumenol by means of air in the presence of complex cobalt salts and Schiff's bases of salicylaldehyde (French Pat. Application published under the No. 2,015,576). This process gives good yields but the complexes employed are expensive products; moreover, it requires the use of large amounts of dimethylformamide as the solvent, which must be removed thereafter by distillation under reduced pressure.

Other oxidation processes have been proposed, which make use of common oxidising agents such as alkali dichromates or manganese dioxide. Thus, a yield of 50% of trimethylquinone was obtained by reacting sodium dichromate with 3-pseudocumenol dissolved in concentrated sulphuric acid (Journal of Organic Chemistry, 4, 320, 1939). This yield is improved when the process is carried in successive steps, firstly by treating 3-pseudocumenol with concentrated sulphuric acid in order to produce the corresponding phenolsulphonic acid and then by treating the latter with an oxidising agent such as sodium dichromate or manganese dioxide (U.S. Pat. No. 3,795,708). This process has the disadvantage of employing large quantities of concentrated sulphuric acid under conditions which also promote corrosion. Moreover, it comprises a first step which ends with the formation of trimethyl-phenol-sulphonic acid which is itself very corrosive. It was thus desirable to provide a process for the oxidation of 3-pseudocumenol to trimethyl-p-benzoquinone which makes it possible to overcome these various disadvantages whilst retaining the advantages of the prior processes, and especially the very good yields.

In a process for the preparation of trimethyl hydroquinone by oxidising 2,3,6-trimethyl phenol with manganese dioxide in an acid medium to form trimethyl para-benzoquinone and then reducing the trimethyl para-benzoquinone to form trimethyl hydroquinone, the present invention provides, the improvement which comprises oxidising the 2,3,6-trimethylphenol with hydrated manganese dioxide in the presence of a saturated aliphatic carboxylic acid containing 1–3 carbon atoms.

The acid used in this process is an alkanoic acid of 1–3 carbon atoms and is preferably acetic acid.

By hydrated manganese dioxide, there is to be understood any manganese dioxide which contains water in any form whatsoever. This can be water of crystallisation as is found in certain natural manganese oxides (psilomelane), or water retained by manganese dioxide when it is prepared by so-called wet methods. Such methods are described in "Pascal — Nouveau traite de chimie minerale, (New treatise on mineral chemistry), Volume 16, pages 761–762" or in "Quarterly Review 13, 67–68, 1959". Manganese dioxide prepared by electrolytic oxidation of manganese salts in an aqueous medium or manganese dioxide resulting from the oxidation of organic products by an alkali permanganate can also be suitable. A particularly advantageous process consists of regenerating manganese dioxide from the manganese salt (especially the acetate) formed during the reaction according to the invention, by treating this product with an oxidising agent such as an aqueous solution of an alkali hypochlorite, hydrogen peroxide, ozone, nitric acid or oxygen.

The quantity of manganese dioxide employed is of the order of 2 mols per mol of pseudocumenol used. However, an excess or a deficiency does not have any detrimental effect on the way in which the reaction takes place. When calculating the proportions of reagents chosen, it is obviously necessary to take into account the content of pure manganese dioxide present in the product used.

The aliphatic acid in the presence of which the oxidation is carried out can be formic acid, acetic acid or propionic acid; acetic acid is very suitable because of its availability and also because it forms, during the oxidation, a manganous acetate which is very suitable for the manganese dioxide regeneration treatment.

The quantity of acid employed is of the order of 4 mols per mol of pseudocumenol. A marked excess thereof can be used, for example 100 mols, and preferably from 10 to 30 mols.

The oxidation reaction can be carried out under cold conditions, but it is preferred to accelerate it by heating between 35°C and the reflux temperature of the reaction mixture. The reaction can be carried out in the presence of a solvent for the quinone, which may or may not be miscible with acetic acid and which, under the working conditions, is resistant to oxidation and then to hydrogenation, such as, for example, benzene, toluene, xylenes, cyclohexane, petroleum ether, a ketone or a chlorinated solvent. It is preferable that the solvent should also dissolve pseudocumenol but not trimethylhydroquinone, and that it should not be miscible with water. The presence of the solvent makes it possible to control the temperature and facilitates the reaction and then successively the separation of the inorganic products and trimethylhydroquinone.

An effective method of controlling the reaction consists of adding pseudocumenol, alone or dissolved in the chosen solvent, gradually to the mixture of manganese dioxide and acetic acid, it being possible for this mixture to be diluted with the same solvent.

During the oxidation reaction, the manganous carboxylate formed precipitates in the reaction mixture, from which it can optionally be removed before reducing the trimethylbenzoquinone. The latter is in solution in the excess acetic acid, where appropriate diluted with the organic solvent chosen, and can be subjected directly (if necessary, after removal of acetic acid) to the reduction treatment. This treatment can be a catalytic hydrogenation carried out by means of the usual catalysts for the hydrogenation of quinones, such as Raney nickel, Raney cobalt or noble metals (palladium, platinum, ruthenium or rhodium) which may or may not be deposited on supports such as alumina, silica, pumice or the different varieties of carbon. The quantity of catalyst, expressed by the weight of metal per 100 g of trimethylbenzoquinone, can vary between 0.01 and 5%.

The hydrogenation can be carried out at a temperature of between 20° and 200°C, and preferably between 50° and 150°C, and under a hydrogen pressure of between 0.1 and 50 bars.

When the reaction is complete, the catalyst is isolated by filtering the reaction mixture and the hydroquinone can be isolated in accordance with the usual techniques. It generally suffices to cool the reaction mixture in order to precipitate it, and to filter it off. It is also possible to reduce the quinone by means of reducing agents such as alkali hydrosulphites [Monatshefte fur Chemie, 83, 16–17 (1952)]: the neutralised organic solution containing trimethylbenzoquinone is poured into an aqueous solution of sodium hydrosulphite, with vigorous stirring; reduction takes place quantitatively and trimethylhydroquinone, which precipitates as it is formed, can be isolated easily.

The following example illustrates the way in which the process is carried out:

EXAMPLE 1

9.5 g of manganese dioxide monohydrate, containing 83% of dioxide (supplied by Messrs. PROLABO) and 50 cm³ of acetic acid are introduced into a 250 cm³ Erlenmeyer flask, and the mixture is heated to 70°C with stirring. A solution of 7 g of 2,3,6-trimethyl-phenol in 20 cm³ of benzene is then run in slowly, the temperature being kept at 70°–75°C (total duration of the running in process 2 hours 30 minutes). The yellow reaction mixture is allowed to cool to ambient temperature and is then neutralised by adding an aqueous solution of sodium bicarbonate until evolution of gas ceases. The benzene layer is decanted and the aqueous layer is extracted with three times 100 cm³ of benzene. The combined benzene layers are reduced to a volume of 100 cm³ by evaporation in vacuo. A solution of 12 g of sodium hydrosulphite in 100 cm³ of water is added, with vigorous stirring, to this orange-red benzene fraction. After a few minutes the colour becomes pale yellow and a crystalline white precipitate forms which is filtered off and washed with distilled water. After draining and drying to constant weight, 6.7 g of a white product are obtained which has a melting point of 173°C (KOFLER) and is identified by elementary analysis and polarography as being trimethylhydroquinone.

0.7 g of unconverted 2,3,6-trimethyl-phenol is determined in the benzene filtrate which had been concentrated to dryness and taken up again in 50 cm³ of ethanol. Degree of conversion: 90% — Yield: 95%.

If the above experiment is repeated but dispensing with the acetic acid, after 28 hours the mixture is still dark brown, which shows that the manganese dioxide has not reacted completely. After filtering off the latter and analysing the filtrate by vapour phase chromatography, 2,3,6-trimethyl-phenol can no longer be detected and only traces of trimethylbenzoquinone can be detected. On reduction by means of sodium hydrosulphite, only traces of trimethylhydroquinone are obtained and condensation products of phenol with itself, with molecular weights of 270 to 834, are identified.

If Example 1 is repeated with anhydrous natural manganese dioxide (pyrolusite), trimethylhydroquinone is obtained in a yield of 29.3%.

Regeneration of the dioxide. 96.2 g of a solution of sodium hydrochlorite of strength 50 chlorometric degrees are added slowly to 50 g of manganous acetate resulting from the preceding operation and dissolved in 150 cm³ of water. A black precipitate of manganese dioxide forms and is filtered off, washed with distilled water and then drained for 15 hours at ambient temperature. The product obtained can be used in a subsequent operation.

EXAMPLE 2

A mixture of 50 cm³ of acetic acid and 13.5 g of manganese dioxide regenerated in accordance with the process described in the preceding example is heated to 45°–50°C. A solution of 6.8 g of trimethylphenol in 40 cm³ of benzene is then run in over the course of 2 hours 30 minutes, and the reaction mixture is then allowed to cool, with stirring, to ambient temperature. 150 cm³ of distilled water and 30 cm³ of benzene are added. The organic layer is decanted and the aqueous layer is extracted with 3 times 100 cm³ of benzene. The combined organic layers are neutralised by means of sodium bicarbonate in aqueous solution. The benzene layer is concentrated and is then reduced by means of sodium hydrosulphite, under the conditions of the preceding example. 5.8 g of trimethylhydroquinone are thus obtained, and 60 mg of unconverted trimethylphenol are measured in the remaining benzene layer. Yield: 78% relative to the trimethylphenol consumed.

We claim:

1. A process for the preparation of trimethyl-para-benzoquinone which comprises oxidising 2,3,6-trimethyl-phenol with hydrated manganese dioxide in an acid medium containing a saturated aliphatic carboxylic acid containing 1–3 carbon atoms at least about a fourfold excess of the carboxylic acid being present with respect to the phenol.

2. Process according to claim 1, wherein the aliphatic acid is acetic acid.

3. Process according to claim 2, wherein a solution of 2,3,6-trimethyl-phenol is run into a mixture of hydrated manganese dioxide and acetic acid.

4. Process according to claim 1, wherein the oxidation is carried out in the presence of a solvent for 2,3,6-trimethyl-phenol and for trimethylbenzoquinone selected from benzene, toluene, a xylene, cyclohexane, and petroleum ether.

5. Process according to claim 1, wherein the hydrated manganese dioxide is a manganese dioxide monohydrate.

6. Process according to claim 1, wherein the hydrated manganese dioxide is obtained by the reaction of the manganese salt formed during a previous run of said process with an oxidising agent.

7. Process according to claim 1, wherein a solution of 2,3,6-trimethyl-phenol is run into a mixture of acetic acid and hydrated manganese dioxide, the reaction mixture is heated between 35°C. and the reflux temperature, to form said trimethyl-para-benzoquinone and, thereafter, the acetic acid and the manganese compounds are removed.

8. Process according to claim 1, wherein 10–30 mols of aliphatic carboxylic acid are used per mole of 2,3,6-trimethyl-phenol.

9. Process according to claim 1 wherein a solution of 2,3,6-trimethylphenol is run into a mixture of the hydrated manganese dioxide and aliphatic carboxylic acid, 10 to 30 mols of acid being present per mol of phenol, and the reaction mixture is heated between 35°C. and the reflux temperature.

* * * * *